US011790636B1

(12) United States Patent
Almog et al.

(10) Patent No.: US 11,790,636 B1
(45) Date of Patent: Oct. 17, 2023

(54) SYSTEM AND METHOD FOR DETECTION OF GAS IN THE ATMOSPHERE FROM A MULTISPECTRAL IMAGE

(71) Applicant: MOMENTICK LTD., Ramat Hasharon (IL)

(72) Inventors: Ophir Almog, Ramat Gan (IL); Lev Oren, Ramat Hasharon (IL); Daniel Kashmir, Ramat Hasharon (IL)

(73) Assignee: MOMENTICK LTD, Ramat Hasharon (IL)

( * ) Notice: Subject to any disclaimer, the term of this patent is extended or adjusted under 35 U.S.C. 154(b) by 0 days.

(21) Appl. No.: 18/165,453

(22) Filed: Feb. 7, 2023

(51) Int. Cl.
  *G06V 10/762* (2022.01)
  *G06V 10/58* (2022.01)
  *G06V 10/75* (2022.01)
  *G06V 20/10* (2022.01)
  *G06V 20/52* (2022.01)

(52) U.S. Cl.
  CPC .......... *G06V 10/7635* (2022.01); *G06V 10/58* (2022.01); *G06V 10/758* (2022.01); *G06V 20/194* (2022.01); *G06V 20/52* (2022.01)

(58) Field of Classification Search
  CPC .. G06V 10/7635; G06V 10/58; G06V 10/758; G06V 20/194; G06V 20/52
  See application file for complete search history.

(56) References Cited

PUBLICATIONS

Deep Remote Sensing, Kumaretal, 2020; IEEE (Year: 2020).*
Multispectral Imagery, PennState, 2022; https://web.archive.org/web/20220929054758/https://learningweather.psu.edu/node/70 (Year: 2022).*
Kumar et al; Deep Remote Sensing Methods for Methane Detection in Overhead Hyperspectral Imagery; University of California Santa Barbara ECE Department Geography Department, 2020; pp. 1776 to 1785.
Scafutto et al; Detection of Methane Plumes Using Airborne Midwave Infrared (3-5um) Hyperspectral Data, Institute of Geosciences, UNICAPM, University of Campinas, 2018.

* cited by examiner

*Primary Examiner* — Jianxun Yang
(74) *Attorney, Agent, or Firm* — PEARL COHEN ZEDEK LATZER BARATZ LLP

(57) ABSTRACT

A system and method for detection of gas in the atmosphere front a multispectral image including a plurality of pixels, each pixel having a spectral signature including a set of intensities of electromagnetic (EM) energy reflected at various bands, the method including: clustering the plurality of pixels based on channels of the spectral signatures that are indicative of presence of the gas, to produce a first set of clusters; clustering the plurality of pixels based on channels of the spectral signatures that are non-indicative of presence of the gas, to produce a second set of clusters; matching clusters from the first set of clusters and the second set of clusters; and labeling clusters that are present in the first set of clusters and not present in the second set of clusters as suspected as including the gas.

20 Claims, 10 Drawing Sheets

SYSTEM AND METHOD FOR DETECTION OF GAS IN THE ATMOSPHERE FROM A MULTISPECTRAL IMAGE

FIELD OF THE INVENTION

The present invention relates generally to detection of gas in the atmosphere from a multispectral image, and specifically to detection of methane.

BACKGROUND

Detecting gases in the atmosphere may be of interest for preventing global warming and climate change. For example, the presence of methane gas (CH4) in the atmosphere is considered a significant contributor to global warming and climate change. Anthropogenic emissions of methane gas may originate from a variety of sources such as livestock, coal mining, oil and gas production, and waste management. However, leakage from oil and natural gas facilities and transmission pipelines are of particular interest. Detecting methane leakage from oil and gas production facilities, as well as from other sources, may be an essential step of resolving methane leaks and reducing methane emissions.

Multispectral satellite instrument (MSI) as well as hyperspectral sensors, like AVIRIS-NG may provide multispectral images of the ground terrain and the atmosphere above it. A multispectral image may be seen as a computational three-dimensional data construct, where two dimensions represent a spatial domain (e.g., pixels in a two-dimensional (2D) image) and the third dimension includes the spectral domain, e.g., reflected amplitude in each wavelength range for each pixel in the 2D-image, referred to as the spectral signature of the pixel. The spectral signature may include spectra of color channels ranging from ultraviolet (380 nm) to shortwave infrared (2510 nm). The quantification of presence of gas in a certain location is based on the atomic and molecular properties of that gas that may cause the gas to absorb a certain wavelength of light. For example, methane gas absorbs light in the wavelength range of 2200 nm to 2400 nm. Multispectral images may observe gases, and specifically methane by providing the detected absorption in this wavelength range. Thus, current research is aimed at detecting methane and other gases from various channels of the multispectral images.

SUMMARY

According to embodiments of the invention, a computer-based system and a method for detection of gas in the atmosphere from a multispectral image including a plurality of pixels, each pixel haying a spectral signature including a set of intensities of electromagnetic (EM) energy reflected at various bands, the method including: clustering the plurality of pixels based on channels of the spectral signatures that are indicative of presence of the gas, to produce a first set of clusters; clustering the plurality of pixels based on channels of the spectral signatures that are non-indicative of presence of the gas, to produce a second set of clusters; matching clusters from the first set of clusters and the second set of clusters; and labeling clusters that are present in the first set of clusters and not present in the second set of clusters as suspected as including the gas.

Embodiments of the invention may further include, for each of the labeled clusters: calculating a difference between the non-indicative channels of the labeled cluster with corresponding channels in each of the clusters in the second set of clusters; and concluding that a background material in the labeled cluster is similar to a background material in the cluster in the second set of clusters if the difference is below a threshold, and that the background material is different otherwise.

According to embodiments of the invention, matching clusters from the first set of clusters and the second set of clusters may be performed based on geometrical or spatial parameters of the first set and the second set of clusters.

Embodiments of the invention may further include, merging the labeled clusters based on Euclidian distance and trend.

Embodiments of the invention may further include, generating a convex hull around the labeled clusters, and labeling the area inside the convex hull as suspected as including the gas.

Embodiments of the invention may further include, calculating a unified spectral signature for each cluster in the first set of clusters; for each pair of clusters in the first set of clusters: dividing each value in a unified spectral signature of a first cluster by a corresponding value of in a unified spectral signature of a second cluster, to obtain a set of ratios for the two clusters; determining that a cluster of the pair of clusters is suspected as including gas based on the ratios; and unifying the labeled clusters with the clusters that suspected as including gas based on the ratios.

According to embodiments of the invention, unifying may include performing a logical operation between the labeled clusters and the clusters that are suspected as including gas based on the ratios.

According to embodiments of the invention, determining that a cluster of the pair of clusters is suspected as including gas based on the ratios may include: determining that a cluster of the pair of clusters is suspected as including gas if an average of the ratios in the indicative channels minus an average of the ratios in the nonindicative channels is larger than a standard deviation of the ratios in the nonindicative channels multiplied by a factor equal or larger than 1.

Embodiments of the invention may further include, for each pixel in the multispectral image, performing a mathematical operation between at least one indicative channel and at least one non-indicative channel, to generate a derived image; clustering the plurality of pixels in the derived image, to produce a third set of clusters; calculating a unified derived value for each cluster in the third set of clusters; labeling clusters in the third set of clusters with a unified derived value above a threshold as suspected as including the gas; and unifying the clusters that are present in the first set of clusters and not present in the second set of clusters with the clusters with the unified derived value above the threshold.

According to embodiments of the invention, unifying may include performing a logical operation between the labeled clusters and the clusters with the unified derived value above the threshold.

Embodiments of the invention may further include, presenting the multispectral image with a visual marking of the clusters that are suspected as including the gas.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
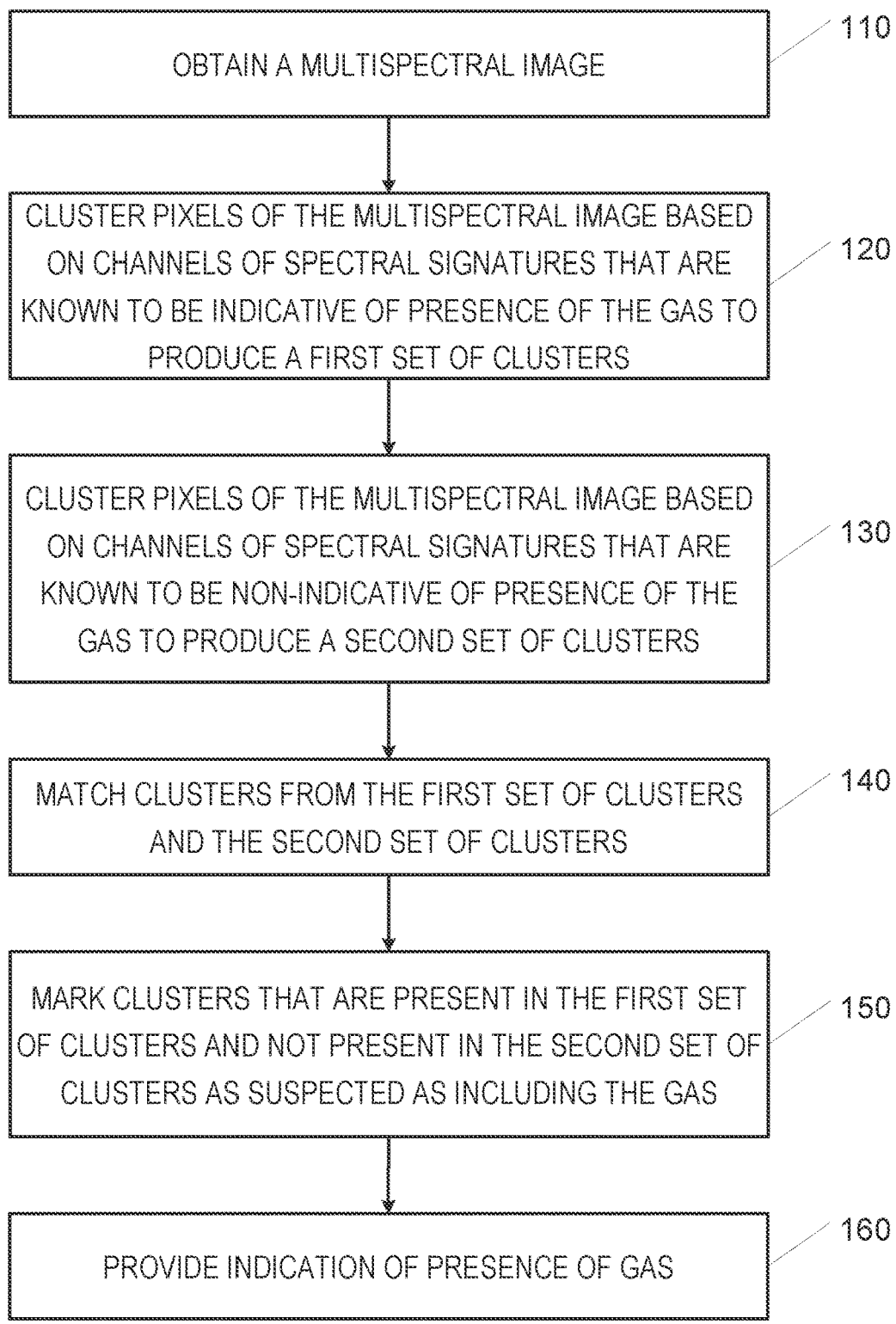
FIG. 1 is a flowchart of a method for detection of gas in the atmosphere from a multispectral image, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

A multispectral image may include a quantitative representation of physical objects provided in any applicable digital and computer format. Multispectral images may include a three-dimensional (3D) data construct where two dimensions (2D) represent a spatial domain (e.g., pixels in a 2D-image) and the third dimension, referred to as the spectral signature of the pixel, includes information describing the spectral domain, e.g., reflected amplitude in each wavelength range for each pixel in the 2D-image. Each wavelength range in the spectral signature may be referred to herein as a channel. The spectral signature may include spectra of wavelengths ranging from ultraviolet, 380 nanometers (nm), to shortwave infrared, 2510 nm or other ranges. The multispectral image may be provided in any applicable digital format such as Geo tiff, tiff, img, etc. A multispectral image may be provided in a digital image file containing image data and metadata. The metadata may describe or include descriptors or values of a plurality of features describing characteristics, qualities or attributes of the image.

Embodiments of the invention may be described with relation to multispectral images of type Geo, tiff or img, etc. Table 1 below presents an example of a set of channels and wavelength of each channel in a multispectral image. Other wavelength channels may be used. As known, the presence of gas in the atmosphere may be manifested (e.g., may be observable) in certain wavelength ranges and not in other wavelength ranges, e.g., as dictated by the absorption level of the gas to the various wavelength ranges. For example, a gas that absorbs a certain wavelength range may be manifested in channels of the multispectral image that include this wavelength range, and not be manifested in channels of the multispectral image that do not include this wavelength range. Thus, the presence of gas in the atmosphere may be manifested in certain channels of the multispectral image while not manifested in other channels, depending on the physical properties of the gas. Channels in the multispectral image that manifest the presence of gas may be referred to herein as indicative channels, and channels in the multispectral image that do not manifest the presence of the gas may be referred to herein as nonindicative channels. It is noted that different gases in the atmosphere may have different physical properties, and may manifest or not manifest in different channels compared to one another. Therefore, the assertion of indicative and nonindicative channels may be made per gas type. For example, the indicative channels for methane gas may be 6, 7 and 8 and the nonindicative channels are 1, 2, 4 and 5. Embodiments of the invention are not limited to a specific type of multispectral image, and may be adjusted to any type of multispectral image that includes indicative and nonindicative channels for the detected gas. Table 1 provides an example of wavelengths of channels of a spectral signature in a multispectral image.

TABLE 1

| Channel No. | Wavelength [nanometer] |
| --- | --- |
| 1 | 1195-1225 |
| 2 | 1550-1590 |
| 3 | 1640-1680 |
| 4 | 1710-1750 |
| 5 | 2145-2185 |
| 6 | 2185-2225 |
| 7 | 2235-2285 |
| 8 | 2295-2365 |

Clustering may be for example grouping entities with some similarity, closeness or shared characteristic, for example according to mathematical, algorithmic, and/or machine learning methods. A classification or clustering of pixels may aggregate, cluster, collect or gather pixels with similar values (e.g., similar spectral signatures or parts of the spectral signatures as disclosed herein) under a single cluster. According to embodiments of the invention, clustering of pixels may be performed based on data in certain channels only. For example, clustering of pixels in the multispectral image based on the indicative channels of the multispectral image may include clustering of pixels in the multispectral image based on values in the indicative channels only. Thus, clustering the multispectral image based on the indicative channels may aggregate, cluster, collect or gather pixels with similar values in the indicative channels under a single cluster. Similarly, clustering the multispectral image based on the nonindicative channels of the multispectral image may include clustering of pixels in the multispectral image based on values in the nonindicative channels only. Thus, clustering the multispectral image based on the nonindicative channels may aggregate, cluster, collect or gather pixels with similar values in the nonindicative channels under a single cluster. According to embodiments of the invention, if gas is present in the area captured in the multispectral image and manifested in the indicative channels, clustering based on the indicative channels may provide other results compared with clustering based on the nonindicative channels. According to embodiments of the invention, those differences may be used to detect gas in the multispectral image.

Embodiments of the invention may provide a system and method for detecting, using a computer processor, the presence of gas in the atmosphere from a multispectral image. Embodiments of the invention may compare the indicative channels to the nonindicative channels in the multispectral image to detect the presence of gas in the area captured in the multispectral image. For example, in some embodiments the results of clustering the multispectral image performed based on indicative channels of the multispectral image may be compared with the results of clustering the multispectral image performed based on nonindicative channels of the multispectral image. According to embodiments of the invention, clusters that are present in the first clustering operation and not present in the second clustering operation may include the gas. Other comparisons and manipulation may be used, as disclosed herein.

Embodiments of the invention may improve the technology of detecting the presence of gas in the atmosphere from a multispectral image. Embodiments of the invention may provide more accurate results compared with current detection techniques, and may require less computational power compared with machine learning techniques. The accuracy and robustness of embodiments of the invention may be further improved by using the unique clustering method disclosed herein.

Reference is made to FIG. 1, which is a flowchart of a method for detection of gas in the atmosphere from a multispectral image, according to embodiments of the invention. An embodiment of a method for detection of gas in the atmosphere from a multispectral image may be performed, for example, by the example computer system shown in FIG. 10. As with other method flowcharts, operations of FIG. 1 may be used with operations in other flowcharts shown herein in some embodiments of the invention.

Figure 10:
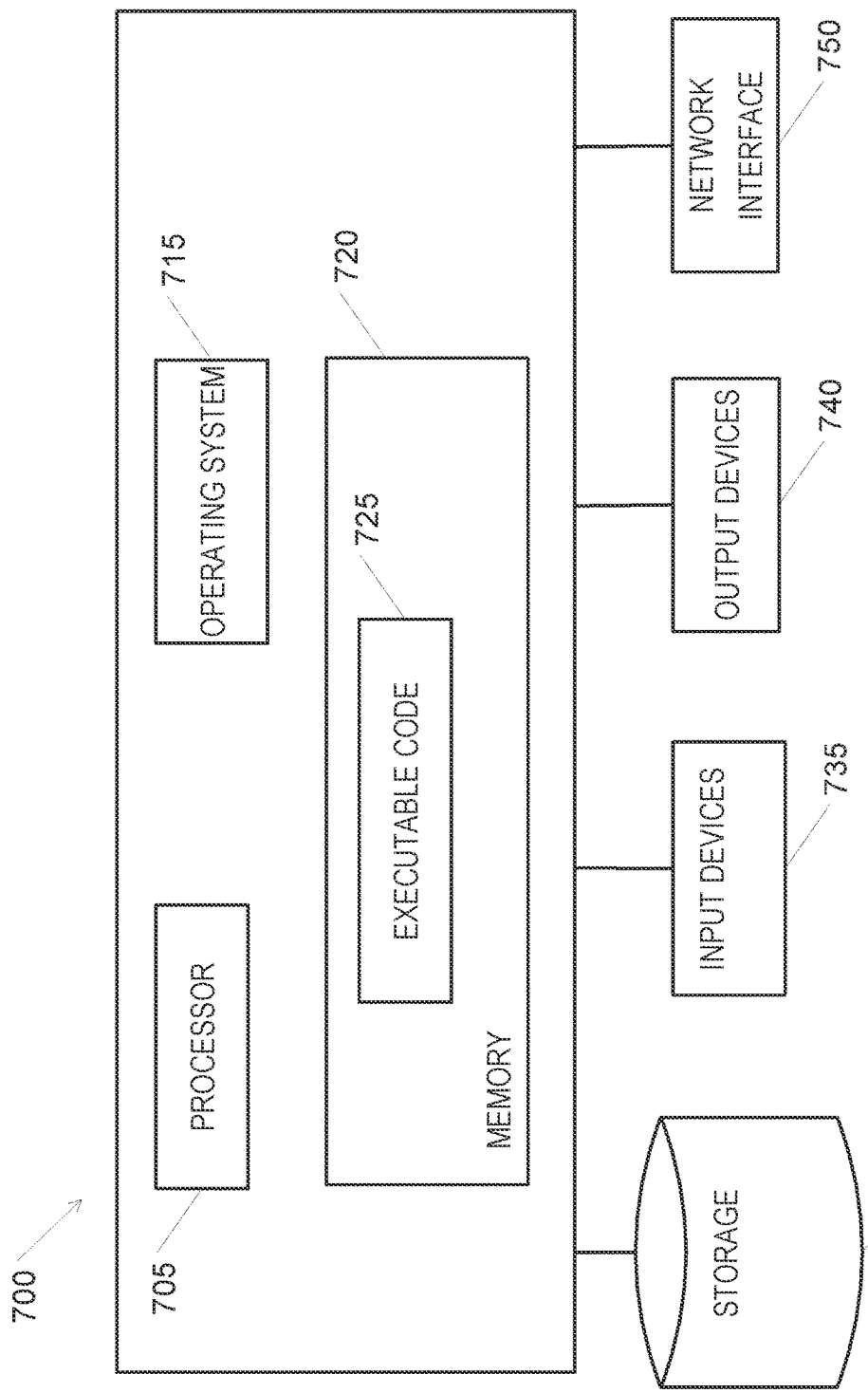
FIG. 10 illustrates an exemplary computing device according to an embodiment of the invention.

In operation 110, a processor, e.g., processor 705 depicted in FIG. 10 may obtain a multispectral image. The multispectral image may include a 3D construct including a 2D array of spatial pixels, where each pixel is associated with a spectral signature, e.g., a vector or set of intensities of electromagnetic (EM) energy reflected at various wavelength bands (that provides the third dimension in the 3D construct). A vector of intensities may be for example an ordered set of intensities, one intensity per wavelength band. For example, when each pixel is associated with a spectral signature as presented in FIG. 1, then the multispectral image may include a construct of eight channels times the 2D pixel array. Other types of multispectral images with other wavelength bands may be used. The multispectral image may be taken by an imager or camera on an airplane or a satellite and may include a representation of a captured landscape and the atmosphere gases above it. Obtaining the multispectral image may include saving the image data in a memory, e.g., memory 720 or storage 730 of FIG. 10.

In some embodiments of the invention, during an image obtaining process or during image acquisition time, one or more sensors of the acquisition device, e.g., a multispectral camera or sensing device, may measure the amount of energy reflected for each pixel of the multispectral image in a plurality of wavelength ranges, e.g., as presented in Table 1. The value of each pixel in the multispectral image for a certain wavelength range may represent the relative amount of light reflection in that specific wavelength range, also referred to as Digital Number (DN).

In operation 120, the processor may cluster the pixels in the multispectral image based on channels of the spectral signatures that are known or deemed to be indicative of presence of a gas of interest, to produce a first set of clusters. In some embodiments, the gas of interest is methane, in which case the indicative channels are channels no. 6, 7 and 8. However, other gases may be observed that may absorb other wavelength ranges and have other indicative channels.

Clustering based on the indicative channels may include grouping together pixels with similar values in the indicative channels, where all the pixels in the same group define a class or a cluster in the segmented or clustered multispectral image. Values in the indicative channels of pixels assigned to a cluster may be more similar to each other than to pixels from other clusters.

In operation 130, the processor may cluster the pixels in the multispectral image based on channels of the spectral signatures that are known to be non-indicative of presence of a gas of interest (e.g. do not correlate with the gas of interest), to produce a second set of clusters. In some embodiments, the gas of interest is methane, in which case the nonindicative channels are channels no. 1, 2, 4 and 5. However, other gases may be observed that may absorb other wavelength ranges and have other nonindicative channels.

Clustering based on the nonindicative channels may include grouping together pixels with similar values in the nonindicative channels, where all the pixels in the same group define a class or a cluster in the segmented or clustered multispectral image. Values in the nonindicative channels of pixels assigned to a cluster may be more similar to each other than to pixels from other clusters.

According to embodiments of the invention, clustering in operations 120 and 130 may be performed in any applicable method, including but not limited to K-means, gaussian mixture modeling (GMM), mean-shift, spectral clustering, graph-based clustering, hierarchical clustering, centroid-based clustering and density-based clustering, density-based spatial clustering of applications with noise (DBSCAN), etc., or methods based on an influence function as disclosed herein. In some embodiments, clustering may be performed using the same method, only based on different channels in operations 120 and 130. In some embodiments, clustering may be performed using the different methods, and based on different channels in operations 120 and 130.

In some embodiments, clustering in operations 120 and/or 130 may be performed based on an influence function. According to embodiments of the invention, each pixel may be perceived as producing one unit of "influence" that is induced to a pre-defined radius of influence also referred to herein as a "cluster radius". The influence absorbed by each of the other pixels may be summed, and pixels with high amount of influence may be selected to be a potential center of cluster. clustering based on influence function is described in detail with reference to FIG. 9.

In operation 140, the processor may match or correlate clusters from the first set of clusters, e.g., the clusters that were obtained based on the indicative channels in operation 120 and the second set of clusters, e.g., clusters that were obtained based on the nonindicative channels in operation 130). According to embodiments of the invention, matching or correlating clusters from the first set of clusters and the second set of clusters may be performed based on geometrical or spatial parameters of the first set and the second set of clusters.

According to some embodiments. the geometrical or spatial parameters may be calculated for clusters that have at least one object that includes more than 3 pixels connected together and the parameters may be calculated only on these objects from the cluster. An example of possible geometrical or spatial parameters is provided below, however, not all listed geometrical parameters may be used and/or other geometrical parameters may be used.

Example geometrical or spatial parameters include:
Total pixels—the total pixel count in the cluster.
Centroid_x_biggest_shape—the x spatial coordinate of the center of the biggest object or pattern in the cluster (object is determined by 8-connectivity).
Centroid_y_biggest_shape—the y spatial coordinate of the center of the biggest object in the cluster (object is determined by 8-connectivity).
Axis_major_length_biggest_shape—the length of the major axis of the ellipse that has the same normalized second central moments as the region of the biggest shape.
Axis_minor_length_biggest_shape—the length of the minor axis of the ellipse that has the same normalized second central moments as the region of the biggest shape.
Area_convex_biggest_shape—the number of pixels of convex hull image, which is the smallest convex polygon that encloses the region of the biggest shape.
Perimeter_biggest_shape—the perimeter of the biggest shape which approximates the contour as a line through the centers of border pixels using a 4-connectivity.
Perimeter_crofton_biggest_shape—the perimeter of the biggest object approximated by the Crofton formula in four directions.
Centroid_x_mean—the x coordinate of the center of the mean of all the objects in the cluster (object is determined by 8-connectivity).
Centroid_y_mean—the y coordinate of the center of the mean of all the objects in the cluster (object is determined by 8-connectivity).
Axis_major_length_mean—the mean of the length of the major axis of the ellipse that has the same normalized second central moments as the region of the shapes.
Axis_minor_length_mean—the mean length of the minor axis of the ellipse that has the same normalized second central moments as the region of the shapes.
Area_mean—the mean area of all the objects in the cluster.
Area_convex_mean—the number of pixels of convex hull image, which is the smallest convex polygon that encloses the region of the mean of all shape.
Eccentricity_mean—the eccentricity of the ellipse that has the same second-moments as the region. The eccentricity is the ratio of the focal distance (distance between focal points) over the major axis length. The value is in the interval [0, 1]. When it is 0, the ellipse becomes a circle, mean of all objects.
Perimeter_mean—the mean perimeter of all objects which approximates the contour as a line through the centers of border pixels using a 4-connectivity.
Perimeter_crofton_mean—the mean perimeter of all objects of object approximated by the Crofton formula in four directions.
Orientation_mean—the mean of the angle between the 0th axis (rows) and the major axis of the ellipse that has the same second moments as the region, ranging from −pi/2 to pi/2 counter-clockwise.
Pca_score—a statistical measure of how much variation in a dataset can be attributed to each of the principal components (eigenvectors) generated by the principal component analysis (PCA) method, division of those two parameters.
Count_1_pixel—how many one pixel objects are in the cluster.
Count_10pixel_and_above—how many ten and above pixel objects are in the cluster.
10px_to_1px—the proportion of the count of 10 pixel and above objects to the count of 1 pixel objects.

According to some embodiments, a match or correlation between a cluster from the first set of clusters, e.g., a cluster that was obtained based on the indicative channels in operation 120 and a cluster from second set of clusters, e.g., a cluster that was obtained based on the nonindicative channels in operation 130) may be determined based on the geometrical or spatial parameters of the clusters. For example, if at least some, e.g., more than seven, spatial parameters, from the list provided above or other spatial parameters, are overlapping by at least 80% it may be determined that the two clusters match, e.g., overlap.

According to embodiments of the invention, the gas of interest may affect values in the indicative channels and not affect values in the nonindicative channels (or substantially affect values only in the indicative channels and not affect values in the nonindicative channels). Therefore, if the gas of interest is present in the area captured in the multispectral image, then clustering based on the indicative channels may generate clusters in which the gas of interest is present, while those clusters may not be generated at all when clustering based on the nonindicative channels. Therefore, in operation 150, the processor may conclude or determine that clusters that are present in the first set of clusters and not present in the second set of clusters are suspected as including the gas. The processor may further label, tag, mark or otherwise indicate clusters that are present in the first set of clusters (indicative) and not present in the second set of clusters (nonindicative) as suspected as including the gas. In operation 160, the processor may provide an indication of presence of gas in the labeled or marked clusters, e.g., to a human user, to a monitoring authority or to a monitoring application for further investigation and analysis. For example, the processor may provide images including visual presentation (e.g., that is visible to a person) of the clusters that are suspected as including the gas. For example, the processor may provide a visual indication of the clusters that are suspected as including the gas to a human user by presenting the image with a visual marking of the clusters that are suspected as including the gas, e.g., using a particular pattern or coloring. If the geographical coordinates of the area presented in the multispectral image are known, the processor may provide geographical coordinates of the clusters that are suspected as including the gas.

Figure 2A:
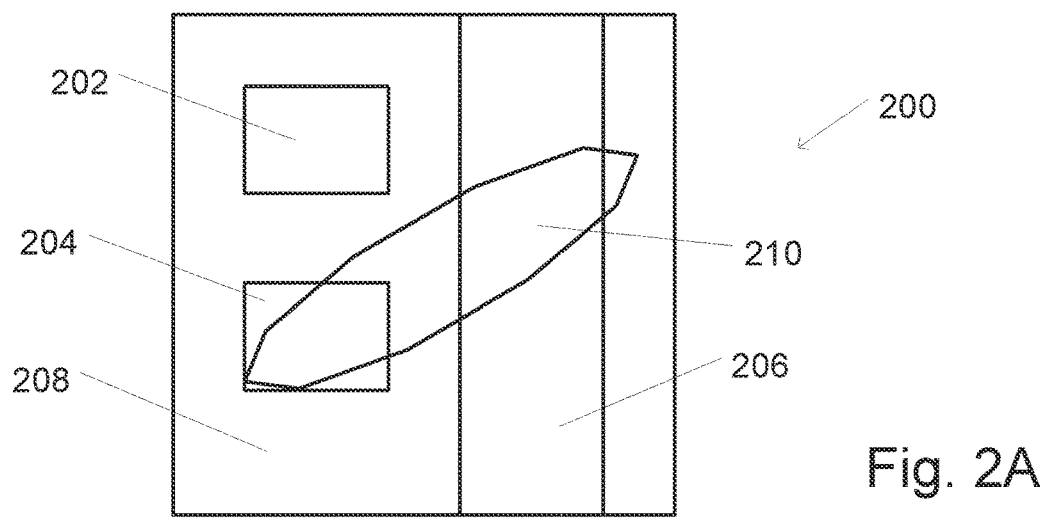
FIG. 2A is a schematic diagram of a multispectral image of a landscape, helpful in demonstrating embodiments of the invention.
Figure 2B:
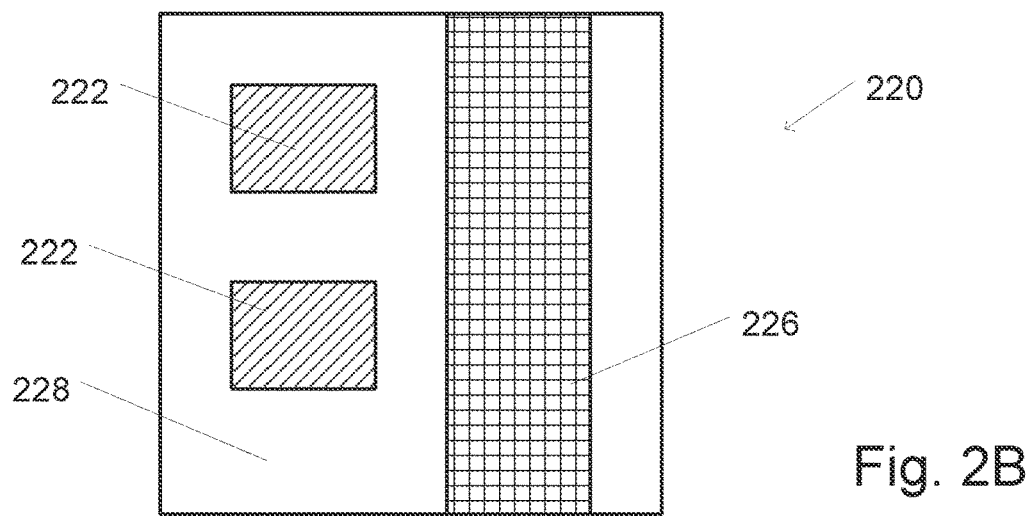
FIG. 2B is a schematic diagram of a second image including the image of a landscape clustered based on the nonindicative channels, according to embodiments of the invention.
Figure 2C:
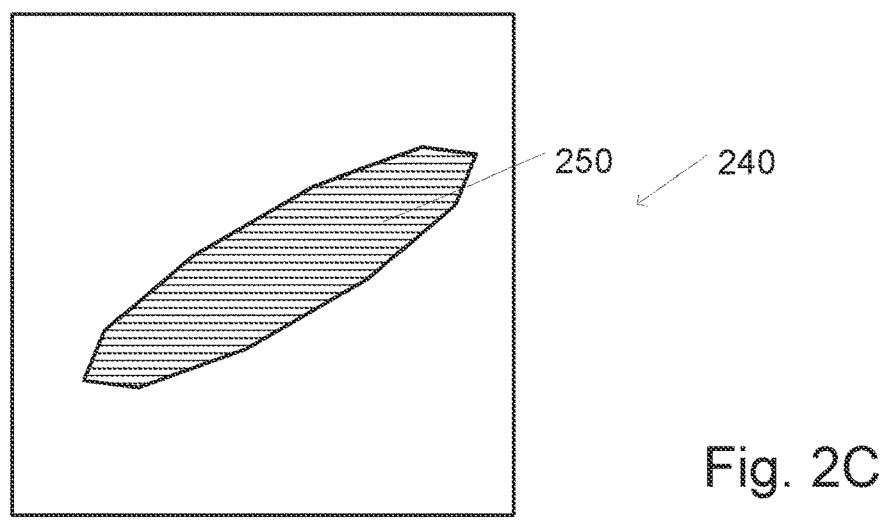
FIG. 2C is a schematic diagram of a second image including the image of a landscape clustered based on the indicative channels, according to embodiments of the invention.

Reference is now made to FIGS. 2A, 2B and 2C, which present a schematic diagram of a multispectral image 200 of a landscape, a second image 220 including image 200 clustered based on the nonindicative channels, and a third image 240 clustered based on the indicative channels, respectively. Multispectral image 200 provides visualization of both the indicative and the nonindicative channels includes buildings 202 and 204, a road 206, ground area 208 and gas plume 210 that is above a part of building 204, road 206 and ground area 208. According to embodiments of the invention, multispectral image 200 may be clustered based on the nonindicative channels (e.g., the channels in which gas plume 210 is not visible, operation 130) to produce image 220. As can be seen, buildings 202 and 204 are clustered to a single cluster 222 marked with right diagonal lines, road 206 is clustered to a second cluster 226 marked with squares, and ground area 208 is clustered to a third cluster 228 that is left blank. According to embodiments of the invention, multispectral image 200 may be further clustered based on the indicative channels (e.g., the channels in which gas plume 210 is visible, operation 120) to produce image 240. As can be seen, image 240 include a cluster 250 of the gas plume 210, marked with horizontal lines, that was not present in image 220. Therefore, according to embodiments of the invention, cluster 250 may be suspected, marked or labeled as including gas.

It is noted that FIGS. 2A, 2B and 2C are schematic and highly simplified and provided for illustration purposes only. In real life scenarios, various artifacts may create noise that may degrade the accuracy and detection sensitivity the embodiment of the method for detection of gas in the atmosphere presented in FIG. 1. Those real-world artifacts may be caused by illumination conditions, topography, partial cloud coverage, etc., and may add noise to both the indicative channels and the nonindicative channels. The noise may be non-linear and may interfere with the clustering operations of both the indicative channels and the nonindicative channels. Therefore, some embodiments of the invention include performing gas detection from multi spectral images in various methods and combining the results of two or more methods in order to cancel artifacts and improve the accuracy of gas detection.

Figure 3:
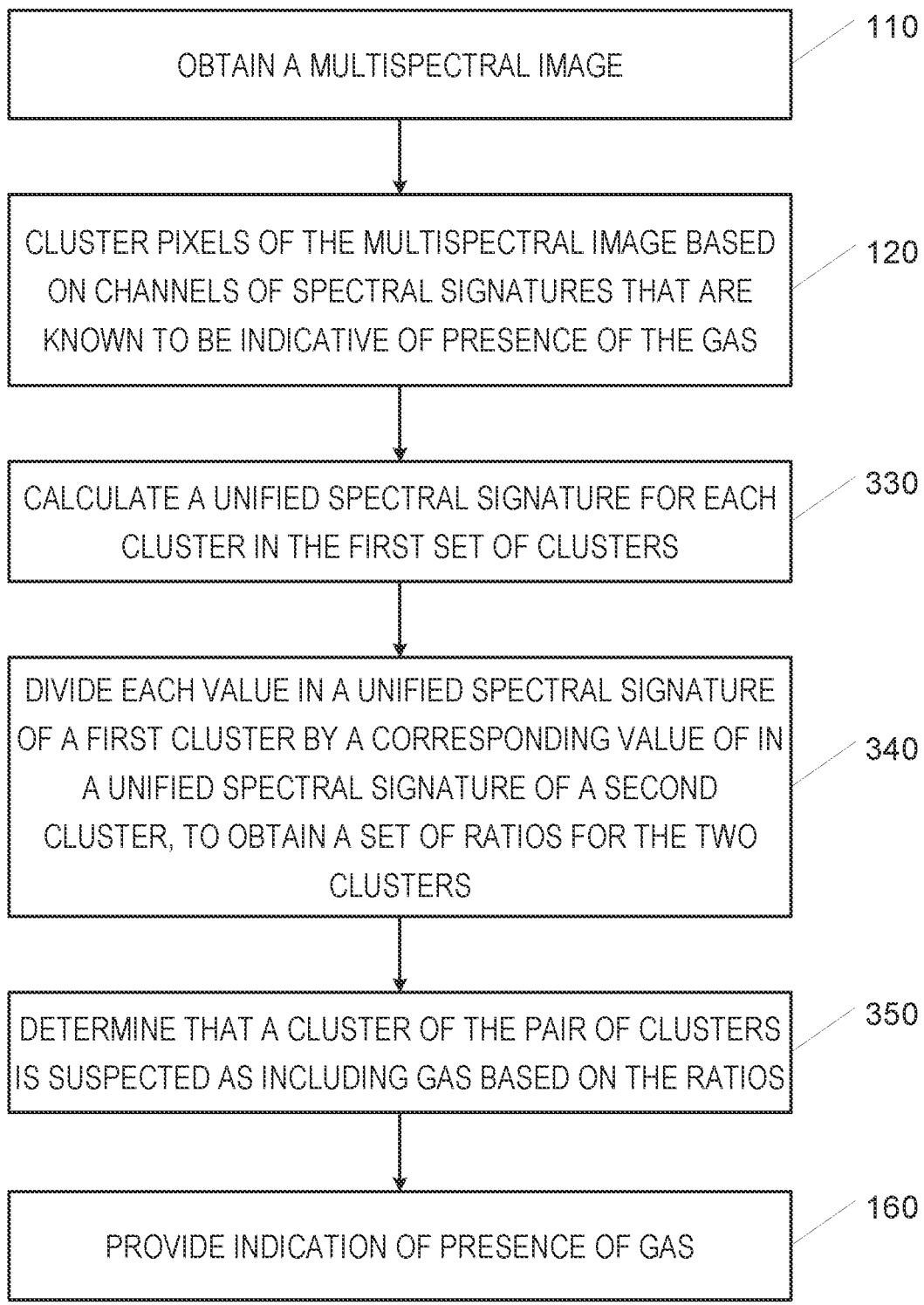
FIG. 3 is a flowchart of a second method for detection of gas in the atmosphere from a multispectral image, according to embodiments of the invention.

Reference is made to FIG. 3, which is a flowchart of a method for detection of gas in the atmosphere from a multispectral image, according to embodiments of the invention. An embodiment of a method for detection of gas in the atmosphere from a multispectral image may be performed, for example, by the example computer system shown in FIG. 10. As with other method flowcharts, operations of FIG. 3 may be used with operations in other flowcharts shown herein in some embodiments of the invention, furthermore, operations of FIG. 3 that are similar or identical to operations in FIG. 1 are, provided with the same reference numerals, and will not be described again.

In operation 330, after clustering a multispectral image based on the indicative channels as disclosed herein, a processor, e.g., processor 705 depicted in FIG. 10 may calculate a unified spectral signature for each cluster in the first set of clusters. For example, a unified spectral signature of a cluster may be calculated by averaging, taking a median or performing additional or other mathematical operations on values of the spectral signature of pixels in the cluster. Thus, the unified spectral signature may include a value in each channel that is representative of values of pixels in the specific channel. In operation 340, the processor may divide each value in a unified spectral signature of a first cluster by a corresponding value of in a unified spectral signature of a second cluster, to obtain a set of ratios for the two clusters. In operation 350, the processor may determine that a cluster of the pair of clusters is suspected as including gas based on some or all of the ratios in the set of ratios. For example, the processor may determine that a cluster of the pair of clusters is suspected as including gas if an average of the ratios in the indicative channels minus an average of the ratios in the nonindicative channels is larger than a standard deviation of the ratios in the nonindicative channels multiplied by a factor equal or larger than 1, e.g., by a value in the range of 2-4. Other values that are larger than one may be used.

Figure 4:
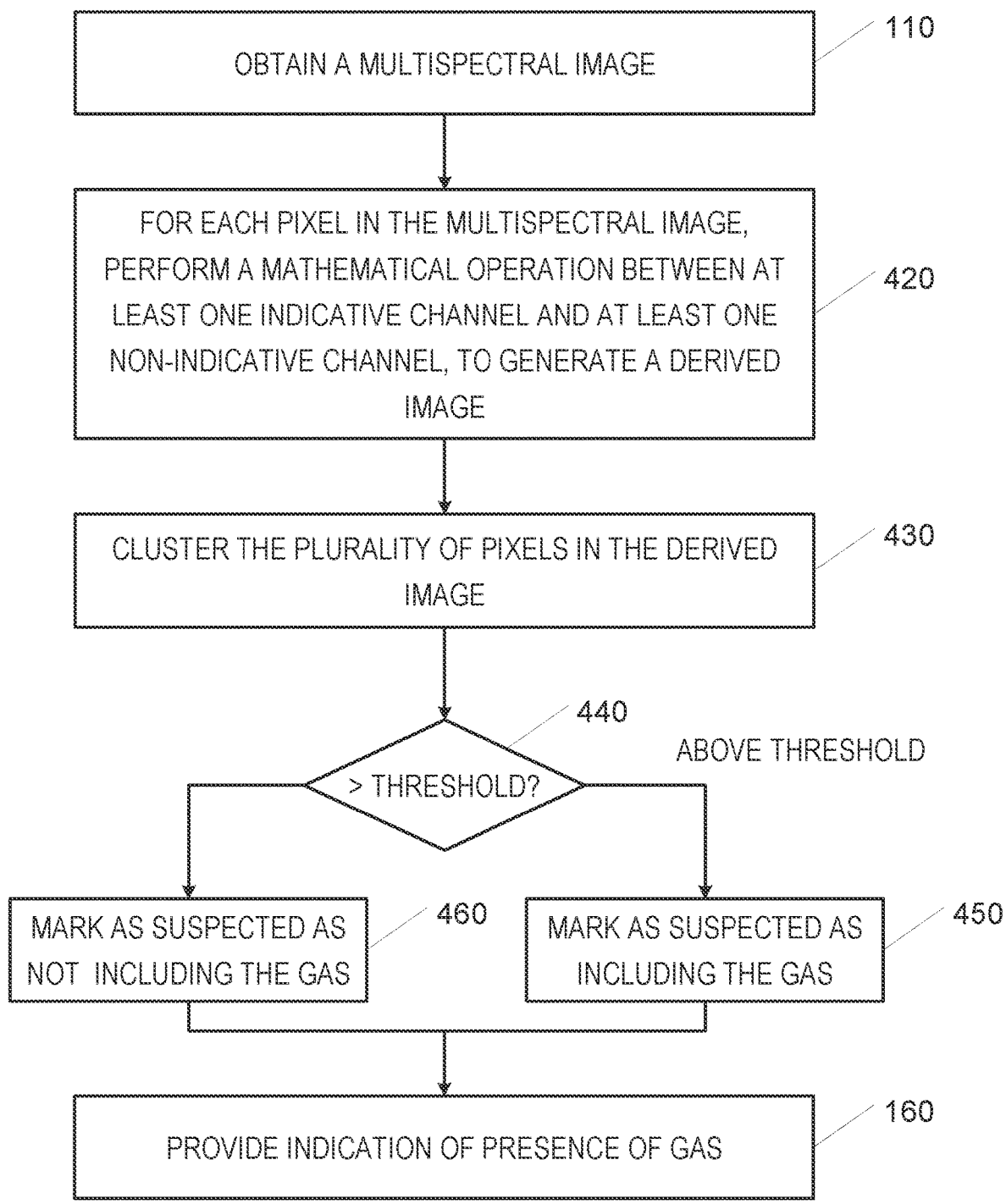
FIG. 4 is a flowchart of a third method for detection of gas in the atmosphere from a multispectral image, according to embodiments of the invention.

Reference is made to FIG. 4, which is a flowchart of a third method for detection of gas in the atmosphere from a multispectral image, according to embodiments of the invention. An embodiment of a third method for detection of gas in the atmosphere from a multispectral image may be performed, for example, by the example computer system shown in FIG. 10. As with other method flowcharts, operations of FIG. 4 may be used with operations in other flowcharts shown herein in some embodiments of the invention. Furthermore, operations of FIG. 4 that are similar or identical to operations in FIG. 1 are provided with the same reference numerals, and will not be described again.

In operation 420, after obtaining a multispectral image, a processor, e.g., processor 705 depicted in FIG. 10 may, for each pixel in the multispectral image, perform a mathematical operation between a value in at least one indicative channel and a value in at least one non-indicative channel, to generate a derived image. For example, the mathematical operation may include division, subtraction, multiplication, etc. and any combination thereof.

In operation 430, the processor may cluster the plurality of pixels in the derived image. According to embodiments of the invention, clustering in operation 430 may be performed using any applicable manner, as described with relation to operations 120 and 130 of FIG. 1. In some embodiments, clustering is performed based on an influence function as disclosed herein. In operation 440, the processor may compare the unified derived value to a threshold. As indicated in operation 450, the processor may mark or label clusters with a unified derived value above the threshold as suspected as including the gas, and, as indicated in operation 460, the processor may mark or label clusters with a unified derived value that is not above the threshold as not including the gas.

Figure 5:
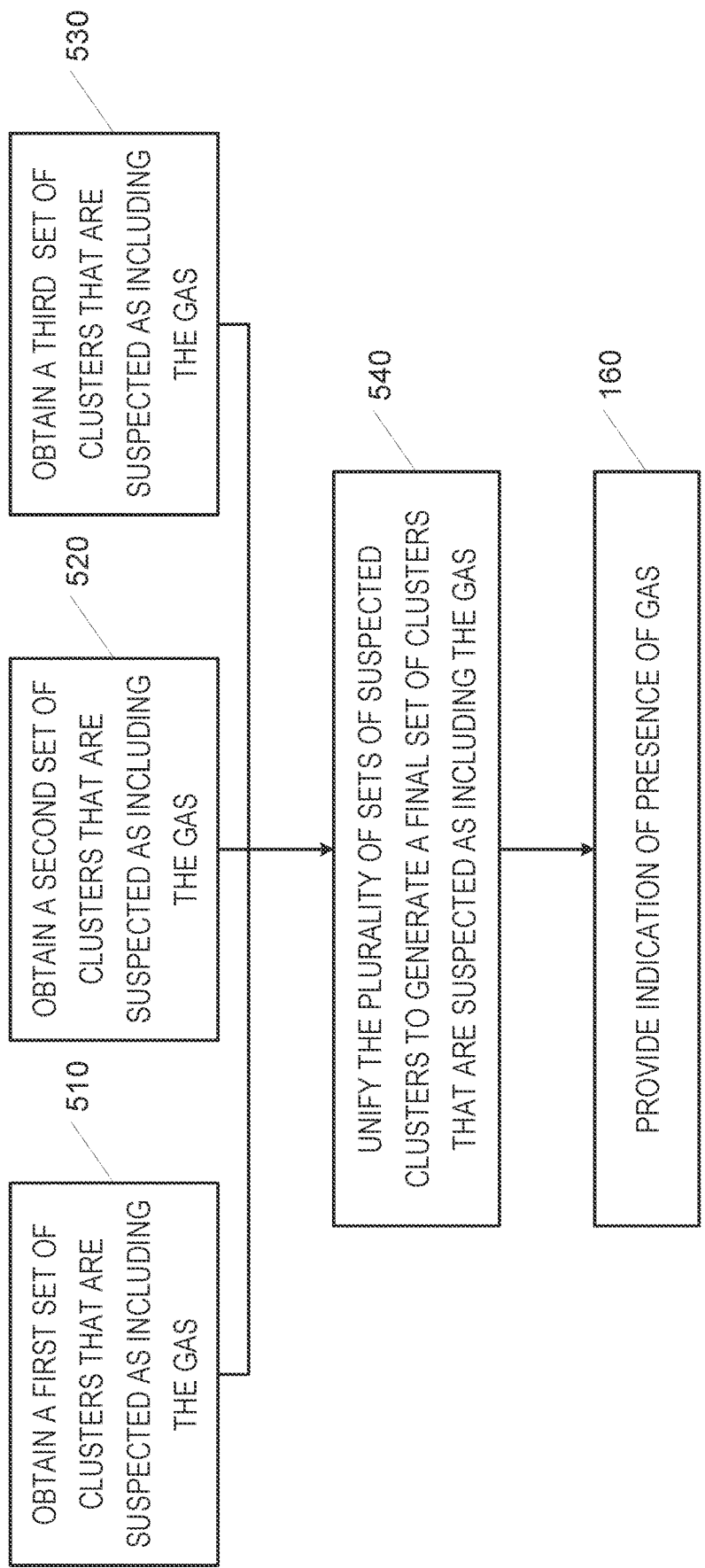
FIG. 5 is a flowchart of a method for combining clusters that are suspected of the presence of gas, according to embodiments of the invention.

Reference is made to FIG. 5, which is a flowchart of a method for combining clusters that are suspected of the presence of gas, according to embodiments of the invention. An embodiment of a second method for detection of gas in the atmosphere from a multispectral image may be performed, for example, by the example computer system shown in FIG. 10. As with other method flowcharts, operations of FIG. 5 may be used with operations in other flowcharts shown herein in some embodiments of the invention. Furthermore, operations of FIG. 5 that are similar or identical to operations in FIG. 1 are provided with the same reference numerals, and will not be described again.

In operation 510, a processor, e.g., processor 705 depicted in FIG. 10 may obtain a first set of clusters that are suspected as including the gas. For example, the processor may obtain the results of operation 150 of FIG. 1. In operation 520, the processor may obtain a second set of clusters that are suspected as including the gas. For example, the processor may obtain the results of operation 350 of FIG. 3. In operation 530, the processor may obtain a third set of clusters that are suspected as including the gas. For example, the processor may obtain the results of operation 450 of FIG. 4. Thus, the processor may obtain a plurality (e.g., two or more) sets of clusters that are suspected as including the gas, where each set may be generated using a different method. In operation 540, the processor may merge, unify or combine the plurality of sets of suspected clusters to generate a final set of clusters that are suspected as including the gas. According to embodiments of the invention, unifying results obtained using different methods may provide more accurate results comparing to using each method alone, since it may remove noises and artifacts of each method. Since each method is different, each may have characteristic or unique artifacts that may not correlate with one another. Thus, combining, merging or unifying results of three different methods with different and uncorrelated artifacts may cancel the artifacts and provide more accurate results. According to embodiments of the invention, merging, unifying or combining clusters from the plurality of sets of clusters may be performed by performing a logical operation between the clusters obtain from the different methods.

According to some embodiments, it may be determined to unify a first cluster (e.g., cluster 250 presented in FIG. 2C) from a first set of clusters that are suspected as including the gas and a second cluster from a second set of clusters that are suspected as including the gas, based on the level of overlap between the first cluster and the second cluster. For example, the spatial overlap between the first cluster and the second cluster may be calculated, and a match may be determined if the overlap is above a threshold, e.g., above a percentage, (e.g., 60%, 70%, 80% or other percentage) of the size of at least one of the two clusters overlap. In some embodiments, it may be enough to find matching clusters from only two methods for detecting gas in a multi spectral image to determine that the clusters represent the gas, e.g., the overlapping areas of the two clusters is a cluster in the final set of clusters that include the gas. In some embodiments, a match is required between a cluster of each of more than two sets of clusters that are suspected as including the gas to include the overlapping area in the final set of clusters that include the gas. If the overlap is not above the threshold, it may be determined that the two clusters do not match, or that there is a discrepancy between the two methods. If a cluster from any set of clusters that are suspected as including the gas does not match any cluster of the other sets, it may be determined that the cluster is a result of an artifact and does not include the gas. In some embodiments, if it is determined that a cluster from other one or more sets of clusters match, then the overlapping area may be determined to include the gas. Other criteria may be used.

Figure 6:
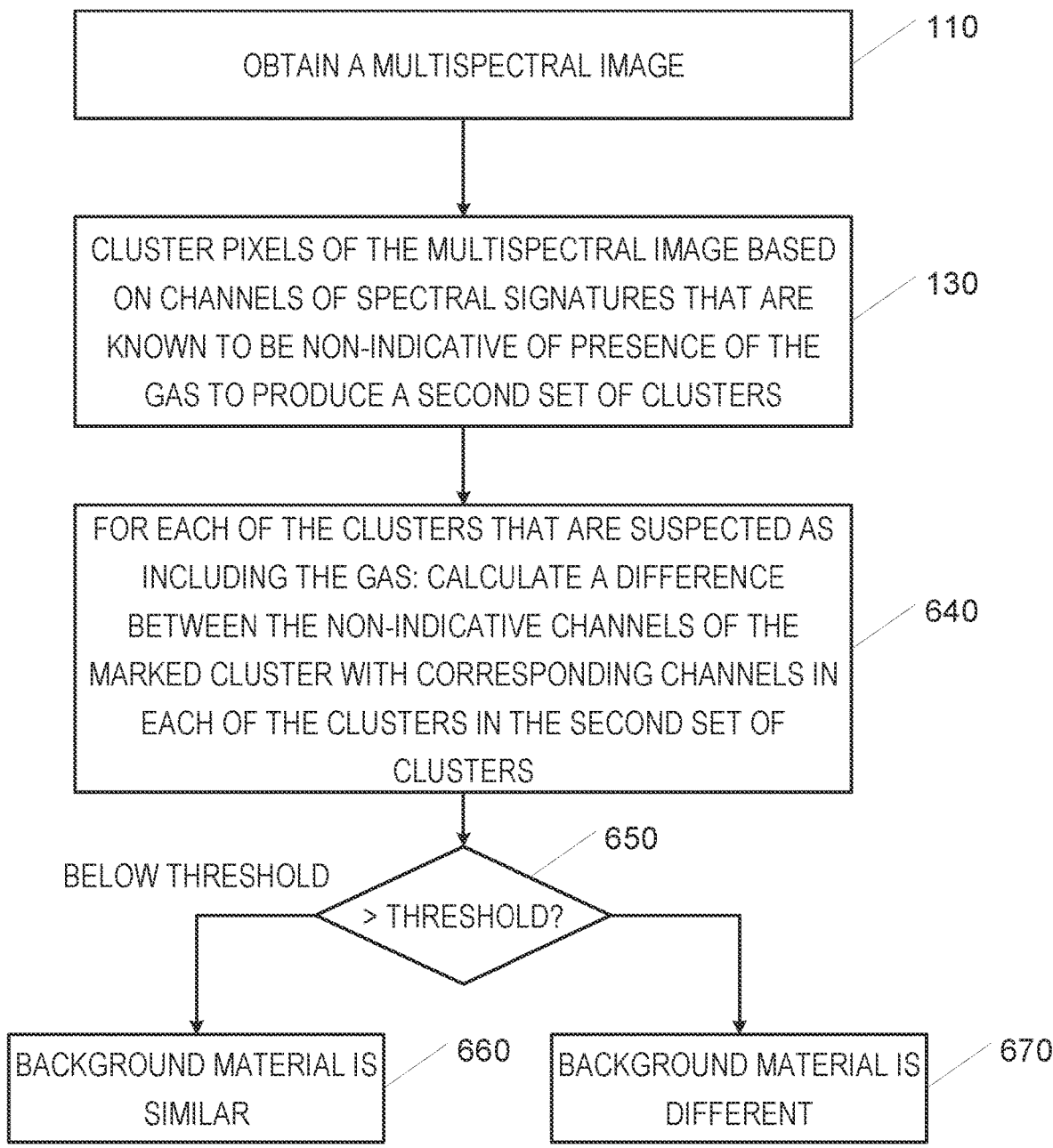
FIG. 6 is a flowchart of a method for analyzing background materials in a multispectral image, according to embodiments of the invention.

Reference is made to FIG. 6, which is a flowchart of a method for analyzing background materials in a multispectral image, according to embodiments of the invention. An embodiment of a method for analyzing background materials in a multispectral image may be performed, for example, by the example computer system shown in FIG. 10. As with other method flowcharts, operations of FIG. 6 may be used with operations in other flowcharts shown herein in some embodiments of the invention. Furthermore, operations of FIG. 6 that are similar or identical to operations in FIG. 1 are provided with the same reference numerals, and will not be described again.

In operation 640, after clustering a multispectral image based on the nonindicative channels as disclosed herein, a processor, e.g., processor 705 depicted in FIG. 10 may, for each of the clusters that are suspected as including the gas: calculate a difference between the non-indicative channels of the marked or labeled cluster with corresponding channels in each of the clusters generated in operation 130 (the second set of clusters). In operation 650, the processor may compare the difference to a threshold. As indicated in operation 660, the processor may conclude, determine or decide that a background material in the marked or labeled cluster is similar to a background material in the cluster in the second set of clusters if the difference is below a threshold, and, As indicated in operation 670, the processor may conclude, determine or decide that a background material in the marked or labeled cluster is different from a background material in the cluster in the second set of clusters otherwise.

Figure 7:
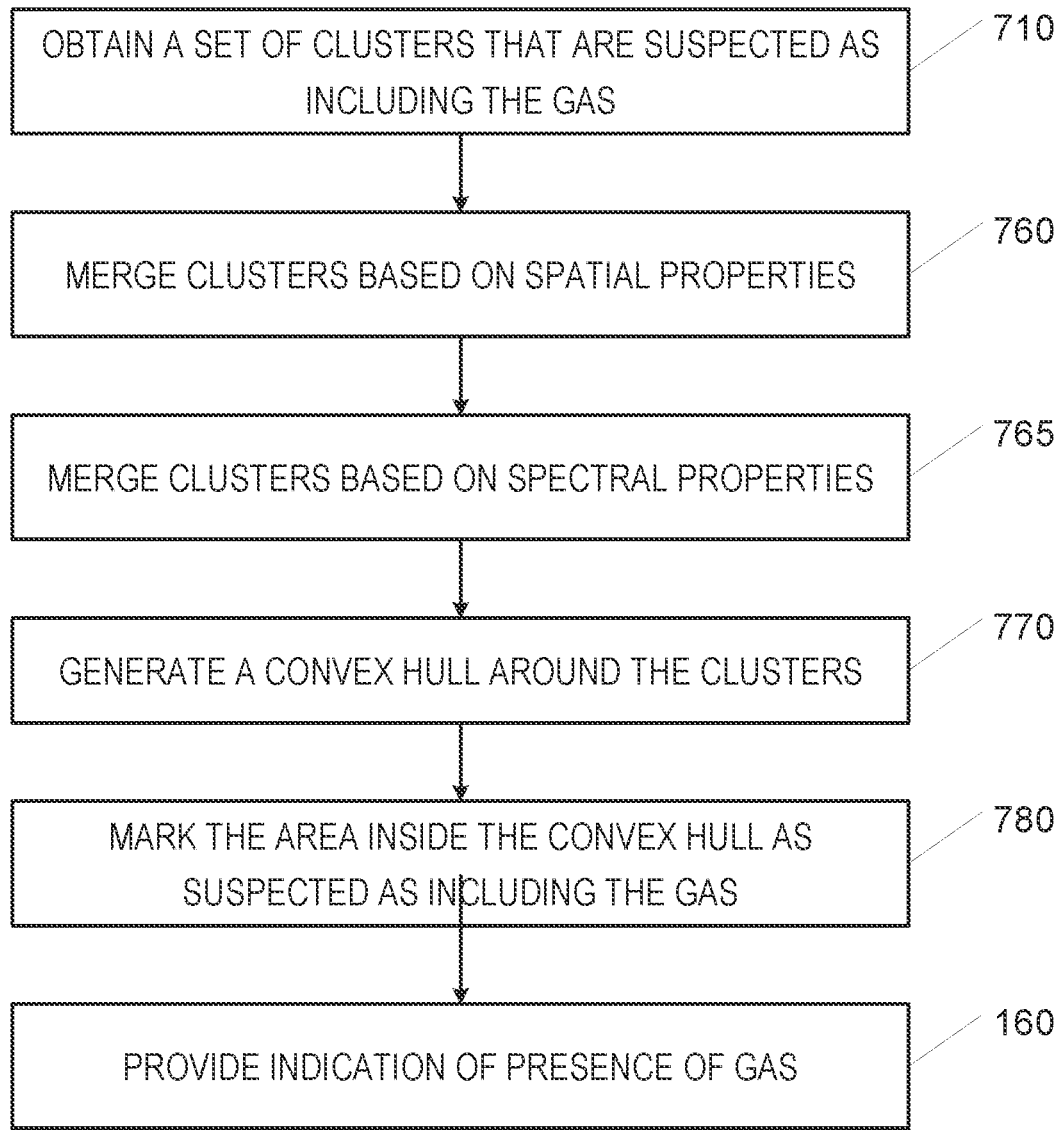
FIG. 7 is a flowchart of a method for refining results of methods for detection of gas in the atmosphere from a multispectral image, according to embodiments of the invention.

Reference is made to FIG. 7, which is a flowchart of a method for refining results of methods for detection of gas in the atmosphere from a multispectral image, according to embodiments of the invention. An embodiment of a method for refining results of methods for detection of gas in the atmosphere from a multispectral image may be performed, for example, by the example computer system shown in FIG. 10. As with other method flowcharts, operations of FIG. 7 may be used with operations in other flowcharts shown herein in some embodiments of the invention. Some or all of the operations of FIG. 7 may be used to refine results of methods for detection of gas in the atmosphere from a multispectral image. Furthermore, operations of FIG. 7 that are similar or identical to operations in FIG. 1 are provided with the same reference numerals, and will not be described again.

In operation 710, a processor, e.g., processor 705 depicted in FIG. 10 may obtain a set of clusters that are suspected as including the gas. For example, the processor may obtain the results of operation 150 of FIG. 1, operation 350 of FIG. 3, operation 450 of FIG. 4 or operation 540 of FIG. 5. In operation 760, the processor may merge clusters based on geometrical or spatial properties, e.g., based on Euclidian distance and trend. Since many emissions of gases, for example, methane gas, have a typical geometrical chape of a plume, clusters that are close (e.g., with Euclidean distance between their center or edges that is smaller than a threshold) and generally follow a plume shape, or a particular direction or trend that may represent a plume, may be merged to a single cluster of gas. The trend may be determined using morphological methods such as the Mahalanobis Distance (MD).

In operation 765, the processor may merge clusters based on spectral properties of the clusters. For example, merging clusters may be performed by calculating a spectral distance between spectral signatures of clusters. In some embodiments, if the spectral distance between the spectral signatures of two clusters is within 2.5 the influence radius, it may be determined or concluded that those two clusters can be merged into a single cluster. Other criteria may be used.

In operation 770, the processor may generate a convex hull (also referred to as a convex envelope or a convex closure) around the clusters, e.g., the merged clusters that are the result of operation 760, 765 or both, or the clusters obtained in operation 710). In operation 780, the processor may mark or label the area inside the convex hull as suspected as including the gas. A convex hull shape may be a convex set, or a smallest convex set, that contains the shape.

Figure 8:
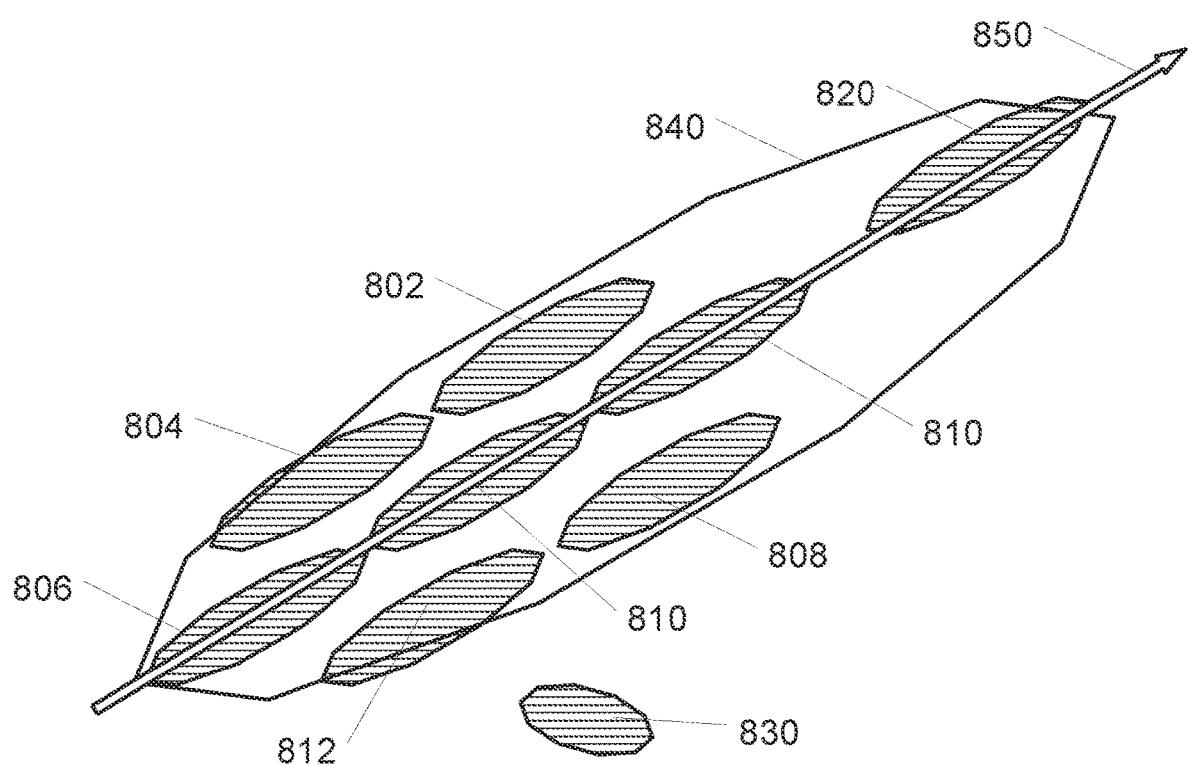
FIG. 8 depicts a plurality of clusters that are suspected as including the gas, and a unified cluster, according to embodiments of the invention.

Reference is now made to FIG. 8 which depicts a plurality of clusters 802-812 that are suspected as including the gas, and a unified cluster 840, according to embodiments of the invention. As can be seen in FIG. 8, clusters 802-812 are relatively close (e.g., the Euclidean distance between their edges is smaller than a threshold) and follow a certain direction or trend marked by arrow 850, may be unified to unified cluster 840. In contrary to that, cluster 830 that may be close to cluster 812, is not included in the unified cluster 840 since cluster 830 does not follow the direction or trend marked by arrow 850.

Figure 9:
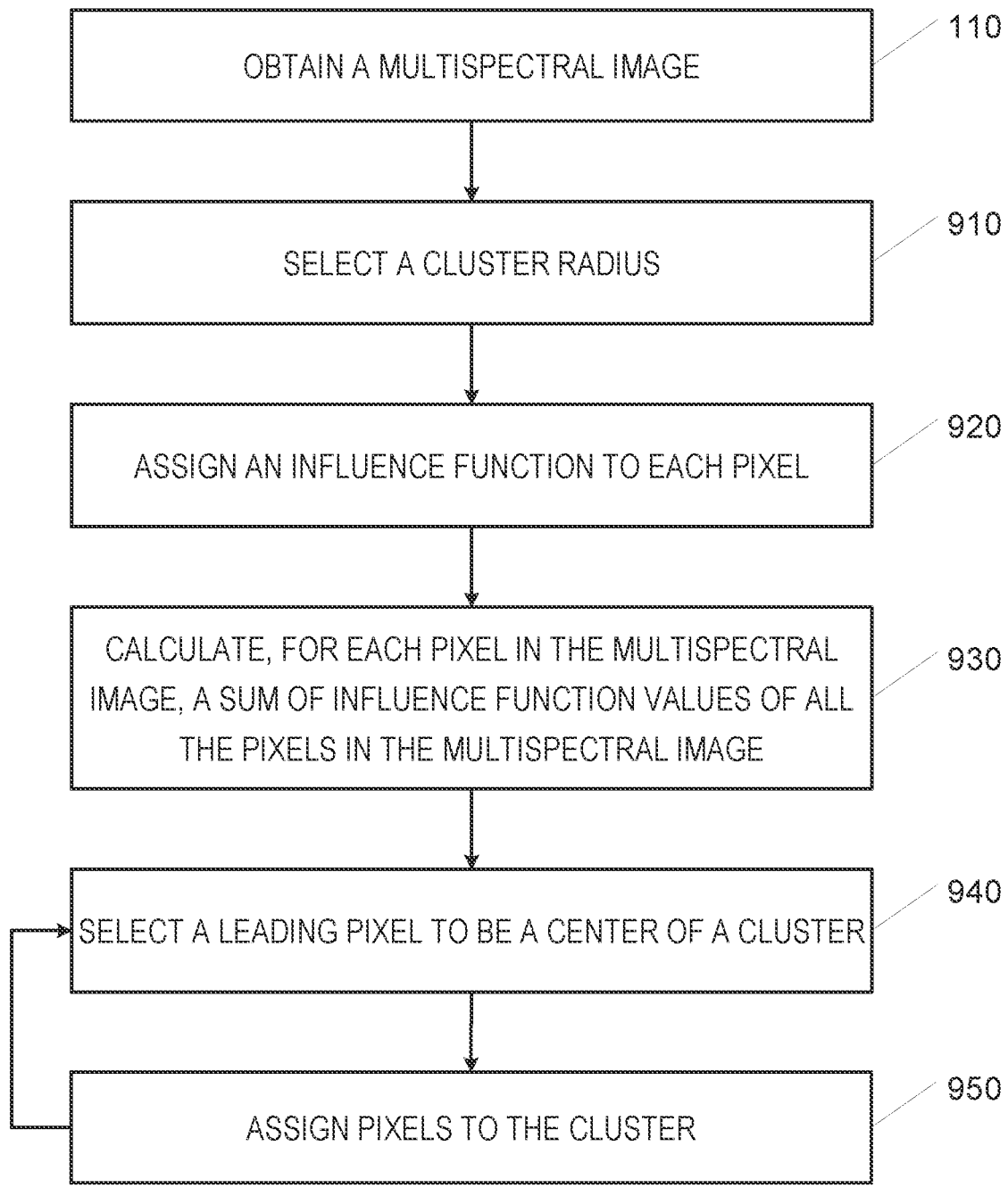
FIG. 9 is a flowchart of a method for clustering of a multispectral image, according to embodiments of the invention.

Reference is made to FIG. 9, which is a flowchart of a method for clustering of a multispectral image, according to embodiments of the invention. The clustering operations described herein may be performed with, may comprise, or may further define operations 120 and 130 of FIG. 1 and other figures and operation 430 of FIG. 4, where pixels may be clustered based on an influence function to generate a plurality of clusters in accordance with embodiments of the invention. An embodiment of a method for clustering of a multispectral image may be performed, for example, by the systems shown in FIG. 10.

In operation 910, a processor, e.g., processor 705 depicted in FIG. 10 may set, select, define or determine a cluster radius. A cluster radius, also referred to herein as "influence radius" or "radial distance" or simply "a radius" may be set, determined or selected according to parameters or characteristics of the multispectral image, arbitrarily or based on predefined choices. The cluster radius may be a predefined distance, e.g., Euclidean distance or distance in units of pixels defined from a location in a multi-dimensional space coordinate system of a pixel in channels of the signal signature that are used for clustering. As disclosed herein, clustering of pixels in the multispectral image may be performed based on a subset of channels of the spectral signature of the pixels, for example, based on indicative channels or based on nonindicative channels.

According to embodiments of the invention a multi-dimensional axis system, also referred to as a multi-dimensional coordinate system, may be defined by the channels of the signal signature that are used for clustering, where each channel that is used for clustering defines a dimension in the multi-dimensional axis system. In the multi-dimensional axis system defined by the channels of the signal signature that are used for clustering, a cluster radius may be used to define a multi-dimensional sphere around a location, or a position of a pixel (in the multi-dimensional axis system) also referred to herein as "cluster center" which may serve as an origin or center of a multi-dimensional sphere defined by the cluster radius. As used herein a position, location and distance of a pixel may describe a position, location and distance of a signal signature or a subset of the signal signature, e.g., the channels of the signal signature that are used for clustering of the pixel, in the multi-dimensional axis system.

A cluster radius may be set for each axis of the multi-dimensional coordinate system and therefore an exemplary spheric radius in a multi-dimensional coordinate system defined for channels 1,2 . . . n, may be calculated according to example equation [1]:

$$r = \sqrt{r_1^2 + r_2^2 + r_n^2} \quad [1]$$

where r is the cluster radius, $r_1$ is the radius set in a first axis defined for a first channel that is used for clustering, $r_2$ is the radius set in a second axis defined for a second channel that is used for clustering and $r_n$ is the radius set in an n-th axis defined for an n-th channel that is used for clustering. The value of the cluster or influence radius may be predefined and may be set based on a plurality of parameters, e.g., a number of pixels, number of hues (e.g., combinations of values in the channels that are used for clustering) in the multispectral image or any other parameter. According to embodiments of the invention, a cluster radius may be arbitrarily set to a first distance, e.g., 5, 10 or 15 color units and may be modified according to the results of the clustering process. Other influence radiuses may be used.

In some embodiments of the invention, an influence radius may be adjusted based on clustering results, for example, if clusters that are too large are obtained during the clustering process, e.g., clusters having a number of image pixels that is above a predefined threshold, clustering operations may be repeated with a smaller influence radius, and if clusters that are too small are obtained, e.g., clusters having a number of image pixels that is below a predefined threshold, clustering operations may be repeated with larger influence radius.

In operation 920, the processor may assign an influence function to each pixel in the multispectral image. According to embodiments of the invention, the influence function may be maximal at a position or a location of a pixel and may decay along the cluster radius around the position of the pixel. In some embodiments, the influence function may be constant (e.g., equal a constant value) along a cluster radius or influence radius around the position of the pixel, and be set to zero elsewhere. For example, the influence function may be maximal at a position of the pixel and may decay gradually, e.g., linearly, exponentially, etc., along a cluster radius or influence radius around the position of the pixel. Other influence functions may be used.

In operation 930, the processor may calculate, for each pixel in the multispectral image, a sum of influence function values of all the pixels in the multispectral image. A sum of the influence function values of all pixels may be calculated, accumulated, summed, or otherwise combined per position of each of the pixels. The value of the influence function may be calculated for each of the pixels with relation to all other pixels.

According to embodiments of the invention, the influence function may be assigned to each pixel and a sum of influence function values of all the plurality of pixels may be calculated with relation to a position of each pixel, in a multi-dimensional axis system. The influence function may be related to a distance from a pixel position or location (in the multi-dimensional axis system), therefore the influence function value may be maximal at a position or a location of a first pixel and may decay along the cluster radius around the position of that pixel. Pixels which are distant from the first pixel may have minimal influence, zero or a value close to zero on the sum of influence function values calculated for the first pixel. In some embodiments, for each pixel, a sum of influence function values of all other pixels may be calculated. In other embodiments, for each pixel a sum of influence function values of pixels located within a predefined distance, e.g., within a multi-dimensional sphere defined by the cluster radius, from the pixel may be calculated. Pixels located in a distance larger than the cluster radius from a first pixel may not affect or may have minimal influence on the sum of influence function values calculated for the first pixel.

Therefore, in some embodiments of the invention, all pixels located within a sphere having the cluster radius around a selected pixel may be identified as pixels that may have influence on the selected pixel. The group of pixels may contain all the pixels which may be located, positioned or found within a multi-dimensional sphere-shaped space or area defined around the selected pixel in the multi-dimensional axis system. The origin of the sphere may be the location of the selected pixel and the cluster radius assigned in operation 910 may define the radius of the multi-dimensional sphere around the selected pixel. All pixels which may be found in the area defined by that sphere, also referred herein as "influence sphere" may be considered as pixels which based on them a cluster may be defined, according to embodiments of the invention.

According to embodiments of the invention, the influence function may be calculated with relation to a position of each o the pixels in the multi-dimensional axis system. Therefore, when calculating the influence function value for a first pixel, the influence function value of the pixel may equal 1 or 1 unit. The influence function may be related to a distance from a pixel and may be calculated according to example formula [4]:

$$\text{Energy value} = \frac{1}{\text{distance}} \quad [4]$$

wherein the distance is a relative distance of a pixel, e.g., from the first pixel, selected as the origin of the multi-dimensional sphere. As with other formulas described herein, different formulas may be used.

The influence function value for each of the pixels may be calculated, e.g., a sum of influence function value of all the pixels with relation to a location or a position of each pixels. In some embodiments, an influence function may be assigned to each of the pixels found within a sphere having a cluster radius around a pixel. The influence function value may be relative to, based on or influenced by the distance of each pixel from the position of the pixel, e.g., the middle or center of the sphere.

In some embodiments, the influence function may be maximal at a position of a pixel and may decay gradually, e.g., linearly, exponentially, etc., along a cluster radius or influence radius around the position of the pixel. Other influence functions may be used. For example, the influence function may be constant (e.g., equal a constant value) along a cluster radius or influence radius around the position of a pixel, and be set to zero elsewhere.

According to embodiments of the invention, pixels may be assigned to clusters based on the combined influence values. Assigning the plurality of pixels to clusters based on the sum of influence function values may include an iterative process that may be repeated until all pixels are assigned to a hue cluster.

In operation 940, the processor may select, each iteration, a leading pixel with a highest sum of influence function values, that is riot assigned to a hue cluster to be a center of a cluster. A leading pixel may be a pixel with the highest summed influence value, e.g., a pixel with the highest accumulated sum of influence values of all pixels or of pixels located in a predefined distance from the leading pixel. The leading pixel may be identified or determined based on the sum of the influence function values of all pixels or pixels within a sphere having a cluster radius around the position of the leading pixel. When a leading pixel is defined or assigned to be a center of a cluster, the location or position of the leading pixel may be defined and serve as a center or origin of a multi-dimensional sphere around that location.

According to embodiments of the invention, a pixel that may achieve the highest sum of energy function values with relation to all the other pixels may be defined as a center of a cluster and his value in the channels used for clustering, may be set as a leading cluster value. For example, a first leading pixel which may be set as a center of a cluster may have the most frequent values in the channels that are used for clustering in the multi spectral image, according to embodiments of the invention.

In operation 950, the processor may assign a plurality of sample pixels to clusters based on the sum of influence function values. When a leading pixel is selected as a center of a hue cluster, pixels located within a multi-dimensional sphere having a cluster radius around the position of the leading pixel may be assigned to the cluster which the leading pixel is its center. All pixels from the plurality of pixels with a distance lower than the influence or cluster radius from the leading pixel may be assigned to that cluster. Pixels assigned to a cluster may be removed or discarded from the process and another iteration of operations 940 and 950 may be repeated, until all pixels are assigned to a cluster.

The clustering process, e.g., assigning pixels to clusters may be an iterative process that may be repeated until all pixels are assigned to a cluster. In each iteration, a position, e.g., of a pixel with the highest summed influence function value, that is not yet assigned to a cluster, may be selected to be a center of a cluster, and all pixels with a distance lower than the influence radius from the selected pixel may be assigned to the cluster.

In some embodiments, adjacent clusters may be united or combined to form a single cluster. This may improve the clustering process since adjacent clusters may share common content and therefore may be united. For example, if the distance between two clusters is lower than a threshold, e.g., 1.5 times the influence radius, than the clusters may be united to a single cluster. The distance may be Euclidean distance or a statistic distance such as Mahalanobis distance, e.g., a distance of a cluster radius and the distribution of image positions in a second cluster.

FIG. 10 illustrates an exemplary computing device according to an embodiment of the invention. For example, a computing device 700 with a processor 705 may be used to detection of gas in the atmosphere from a multispectral image, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a smart device, a smartphone, workstation or a personal computer, a laptop, or may be at least partially implemented by one or more remote servers in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of possibly different memory units.

Executable code 725 may be any executable code, e.g., an application, a program, a process, task or script. Executable code 725 may be executed by processor 705 possibly under control of operating system 715. For example, executable code 725 may be or include code for detection of gas in the atmosphere from a multispectral image, according to embodiments of the invention.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 10 may be omitted. For example, memory 720 may be a non-volatile memory having the storage capacity of storage 730. Accordingly, although shown as a separate component, storage 730 may be embedded or included in memory 720. Storage 730 and or memory 720 may be configured to store multispectral images and any other parameters required for performing embodiments of the invention.

Input devices 735 may be or may include a camera, a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for detection of gas in the atmosphere from a multispectral image comprising a plurality of pixels, each pixel having a spectral signature comprising a set of intensities of electromagnetic (EM) energy reflected at various bands, the method comprising:
   clustering the plurality of pixels based on channels of the spectral signatures that are indicative of presence of the gas, to produce a first set of clusters;
   clustering the plurality of pixels based on channels of the spectral signatures that are non-indicative of presence of the gas, to produce a second set of clusters;
   matching clusters from the first set of clusters and the second set of clusters;
   for each pixel in the multispectral image, performing a mathematical operation between at least one indicative channel and at least one non-indicative channel, to generate a derived image;
   clustering the plurality of pixels in the derived image, to produce a third set of clusters;
   calculating a unified derived value for each cluster in the third set of clusters;
   unifying clusters that are present in the first set of clusters and not present in the second set of clusters with clusters in the third set of clusters with the unified derived value above the threshold; and
   labeling the unified clusters as suspected as including the gas.

2. The method of claim 1, further comprising:
   for each of the labeled clusters: calculating a difference between the non-indicative channels of the labeled cluster with corresponding channels in each of the clusters in the second set of clusters; and
   concluding that a background material in the labeled cluster is similar to a background material in the cluster in the second set of clusters if the difference is below a threshold, and that the background material is different otherwise.

3. The method of claim 1, wherein matching clusters from the first set of clusters and the second set of clusters is performed based on geometrical or spatial parameters of the first set and the second set of clusters.

4. The method of claim 1, comprising:
   merging the labeled clusters based on Euclidian distance and trend.

5. The method of claim 1, comprising:
   generating a convex hull around the labeled clusters, and labeling the area inside the convex hull as suspected as including the gas.

6. The method of claim 1, further comprising:
   calculating a unified spectral signature for each cluster in the first set of clusters;
   for each pair of clusters in the first set of clusters:
   dividing each value in a unified spectral signature of a first cluster by a corresponding value of in a unified spectral signature of a second cluster, to obtain a set of ratios for the two clusters;
   determining that a cluster of the pair of clusters is suspected as including gas based on the ratios; and
   unifying the labeled clusters with the clusters that are suspected as including gas based on the ratios.

7. The method of claim 6, wherein unifying comprises performing a logical operation between the labeled clusters and the clusters that are suspected as including gas based on the ratios.

8. The method of claim 6, wherein determining that a cluster of the pair of clusters is suspected as including gas based on the ratios comprises:
   determining that a cluster of the pair of clusters is suspected as including gas if an average of the ratios in the indicative channels minus an average of the ratios in the nonindicative channels is larger than a standard deviation of the ratios in the nonindicative channels multiplied by a factor equal or larger than 1.

9. The method of claim 1, wherein unifying comprises performing a logical operation between the labeled clusters and the clusters with the unified derived value above the threshold.

10. The method of claim 1, further comprising:
    presenting the multispectral image with a visual marking of the clusters that are suspected as including the gas.

11. A method for detection of gas in the atmosphere from a multispectral image comprising a plurality of pixels, each having a spectral signature comprising a vector of intensities of electromagnetic (EM) energy reflected at various wavelength bands, the method comprising:
    clustering the plurality of pixels based on channels of the spectral signatures that are known to be indicative of presence of the gas, to produce a set of clusters;
    calculating a unified spectral signature for each cluster in the set of clusters;
    for each pair of clusters in the set of clusters:
    dividing each value in a first unified spectral signature by a corresponding value of in a first unified spectral signature, to obtain a set of ratios; and
    determining that a cluster of the pair of clusters is suspected as including gas if an average of the ratios in the indicative channels minus an average of the ratios in the nonindicative channels is larger than a standard deviation of the ratios in the nonindicative channels multiplied by a factor equal or larger than 1.

12. The method of claim 11, comprising:
    merging the clusters that are determined as including gas based on Euclidian distance and trend.

13. The method of claim 11, comprising:
    generating a convex hull around the clusters that are determined as including gas, and labeling the area inside the convex hull as suspected as including the gas.

14. A system for detection of gas in the atmosphere from a multispectral image comprising a plurality of pixels, each pixel having a spectral signature comprising a set of intensities of electromagnetic (EM) energy reflected at various bands, the system comprising:

a memory;

a processor configured to:

cluster the plurality of pixels based on channels of the spectral signatures that are indicative of presence of the gas, to produce a first set of clusters;

cluster the plurality of pixels based on channels of the spectral signatures that are non-indicative of presence of the gas, to produce a second set of clusters;

match clusters from the first set of clusters and the second set of clusters;

label clusters that are present in the first set of clusters and not present in the second set of clusters as suspected as including the gas, calculate a unified spectral signature for each cluster in the first set of clusters;

for each pair of clusters in the first set of clusters:
divide each value in a unified spectral signature of a first cluster by a corresponding value of in a unified spectral signature of a second cluster, to obtain a set of ratios for the two clusters;
determine that a cluster of the pair of clusters is suspected as including gas based on the ratios; and
unify the labeled clusters with the clusters that are suspected as including gas based on the ratios.

15. The system of claim 14, wherein the processor is further configured to:
for each of the unified clusters: calculate a difference between the non-indicative channels of the cluster with corresponding channels in each of the clusters in the second set of clusters; and
conclude that a background material in the unified cluster is similar to a background material in the cluster in the second set of clusters if the difference is below a threshold, and that the background material is different otherwise.

16. The system of claim 14, wherein the processor is configured to match clusters from the first set of clusters and the second set of clusters based on geometrical or spatial parameters of the first set and the second set of clusters.

17. The system of claim 14, wherein the processor is further configured to:
merge the labeled unified clusters based on Euclidian distance and trend;
generate a convex hull around the merged clusters; and
label the area inside the convex hull as suspected as including the gas.

18. The system of claim 14, wherein the processor is configured to unify the labeled clusters with the clusters that are suspected as including gas by performing a logical operation between the labeled clusters and the clusters that are suspected as including gas based on the ratios.

19. The system of claim 18, wherein the processor is configured to determine that a cluster of the pair of clusters is suspected as including gas based on the ratios by:
determining that a cluster of the pair of clusters is suspected as including gas if an average of the ratios in the indicative channels minus an average of the ratios in the nonindicative channels is larger than a standard deviation of the ratios in the nonindicative channels multiplied by a factor equal or larger than 1.

20. The system of claim 14, further comprising:
for each pixel in the multispectral image, performing a mathematical operation between at least one indicative channel and at least one non-indicative channel, to generate a derived image;
clustering the plurality of pixels in the derived image, to produce a third set of clusters;
calculating a unified derived value for each cluster in the third set of clusters;
labeling clusters in the third set of clusters with a unified derived value above a threshold as suspected as including the gas; and
unifying the unified clusters with the clusters with the unified derived value above the threshold.

* * * * *